(12) United States Patent
DePietro et al.

(10) Patent No.: US 7,931,168 B2
(45) Date of Patent: Apr. 26, 2011

(54) PORTABLE MANWAY COVER HINGE DEVICE

(75) Inventors: Edward A. DePietro, Manchester, NH (US); James J. Porebski, North Tonawanda, NY (US)

(73) Assignee: Universal Hinge Corporation, Manchester, NH (US)

( * ) Notice: Subject to any disclaimer, the term of this patent is extended or adjusted under 35 U.S.C. 154(b) by 1011 days.

(21) Appl. No.: 11/736,198

(22) Filed: Apr. 17, 2007

(65) Prior Publication Data

US 2008/0256866 A1 Oct. 23, 2008

(51) Int. Cl.
*B65D 43/16* (2006.01)
*B65D 51/04* (2006.01)
*E05D 3/18* (2006.01)

(52) U.S. Cl. ........ 220/812; 220/817; 220/845; 220/848; 16/248

(58) Field of Classification Search ........... 220/812, 220/817, 845, 848; 49/236; 16/382, 387, 16/233, 248
See application file for complete search history.

(56) References Cited

U.S. PATENT DOCUMENTS

| | | | |
|---|---|---|---|
| 510,300 A | 12/1893 | Stillwell | |
| 971,686 A | 10/1910 | Michael et al. | |
| 1,256,688 A | 2/1918 | Hall | |
| 2,941,236 A * | 6/1960 | Monroe et al. | 16/368 |
| 3,119,512 A * | 1/1964 | Foster | 220/817 |
| 3,454,184 A * | 7/1969 | Halpin | 220/327 |
| 3,559,838 A * | 2/1971 | Bow | |
| 3,665,958 A | 5/1972 | Dunkelis | |
| 3,721,363 A * | 3/1973 | Bressler et al. | 220/315 |
| 4,080,998 A | 3/1978 | Mottola et al. | |
| 4,141,109 A * | 2/1979 | Farrell | 16/237 |
| 4,286,727 A * | 9/1981 | Limoncelli | 220/244 |
| 4,297,072 A | 10/1981 | Shah et al. | |
| 4,398,649 A | 8/1983 | Labbe | |
| 4,456,135 A | 6/1984 | Beekes | |
| 4,519,519 A | 5/1985 | Meuschke et al. | |
| 4,655,365 A * | 4/1987 | Miller | 220/314 |
| 4,664,586 A | 5/1987 | Vassalotti | |
| 4,669,628 A | 6/1987 | Hatta | |
| 4,865,513 A | 9/1989 | Norris | |
| 5,038,520 A | 8/1991 | Amorese et al. | |
| 5,050,628 A | 9/1991 | Ripley et al. | |
| 5,056,673 A | 10/1991 | Williams | |
| 5,092,963 A | 3/1992 | Baker et al. | |
| 5,184,422 A | 2/1993 | Wade et al. | |
| 5,228,825 A | 7/1993 | Fruchtbaum et al. | |
| 5,327,684 A * | 7/1994 | Herbst | 49/506 |
| 5,394,650 A | 3/1995 | Dean | |
| 5,403,053 A | 4/1995 | Zareck | |
| 5,431,248 A | 7/1995 | Willaughby | |
| 5,617,963 A | 4/1997 | Baziuk et al. | |

(Continued)

FOREIGN PATENT DOCUMENTS

GB 2282422 A 4/1995
JP 06024490 A * 2/1994
JP 2000313495 A * 11/2000

*Primary Examiner* — Anthony Stashick
*Assistant Examiner* — Niki M Eloshway
(74) *Attorney, Agent, or Firm* — Robert R. Deleault, Esq.; Mesmer & Deleault, PLLC

(57) ABSTRACT

A portable manway hinge device has a pair of elongated hinge members where each hinge member has a pair of longitudinally-aligned, elongated apertures, a support member slidably connected to each of the elongated apertures where the support member has a pin receiving end, and a linkage member pivotally connected to each of the pair of elongated hinge members.

16 Claims, 8 Drawing Sheets

U.S. PATENT DOCUMENTS

| | | |
|---|---|---|
| 6,129,225 A | 10/2000 | Giannoglou et al. |
| 6,454,117 B1 * | 9/2002 | Pysher et al. .................. 220/327 |
| 6,786,343 B1 * | 9/2004 | Porebski et al. .............. 212/179 |
| 7,556,160 B2 * | 7/2009 | Porebski et al. .............. 212/179 |
| 2004/0108660 A1 * | 6/2004 | Frew et al. .................... 277/628 |
| 2005/0242051 A1 | 11/2005 | Porebski et al. |
| 2006/0059662 A1 * | 3/2006 | Roeper ........................... 16/382 |
| 2006/0219649 A1 | 10/2006 | Wolfford, Sr. |

\* cited by examiner

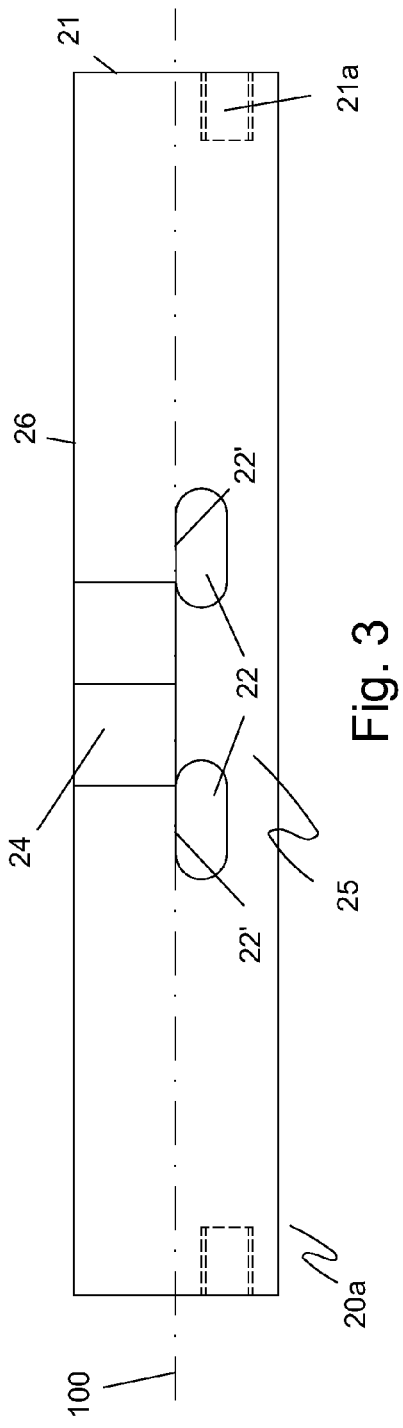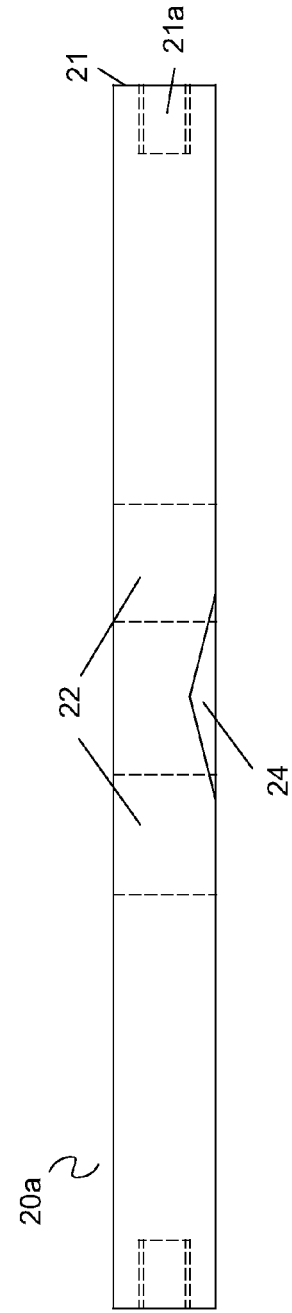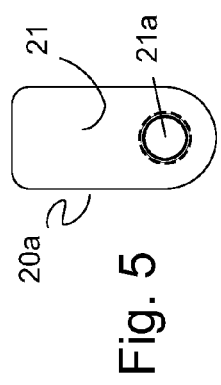

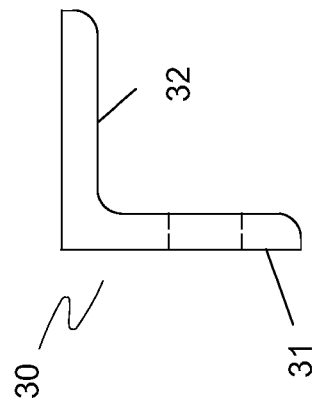
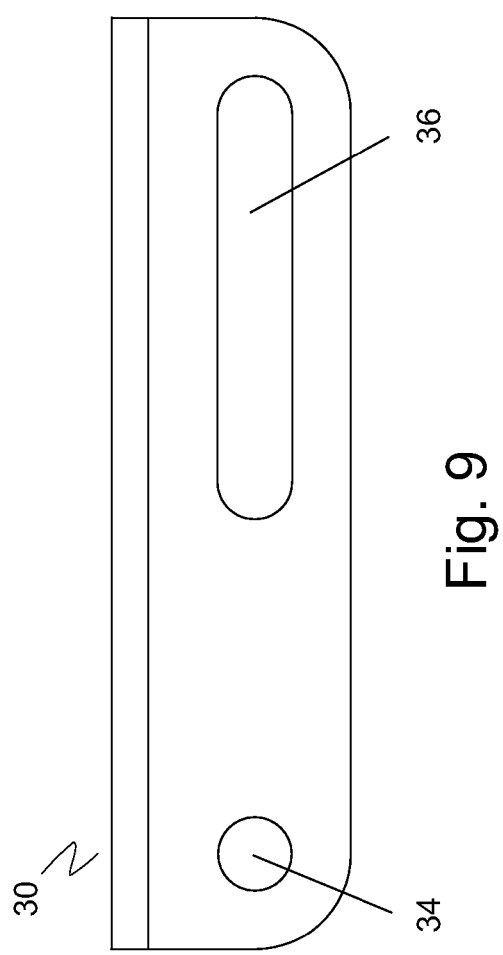
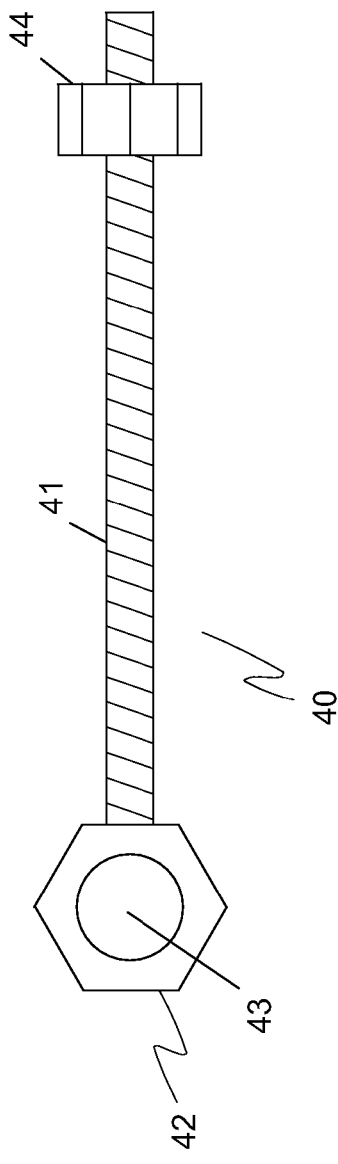

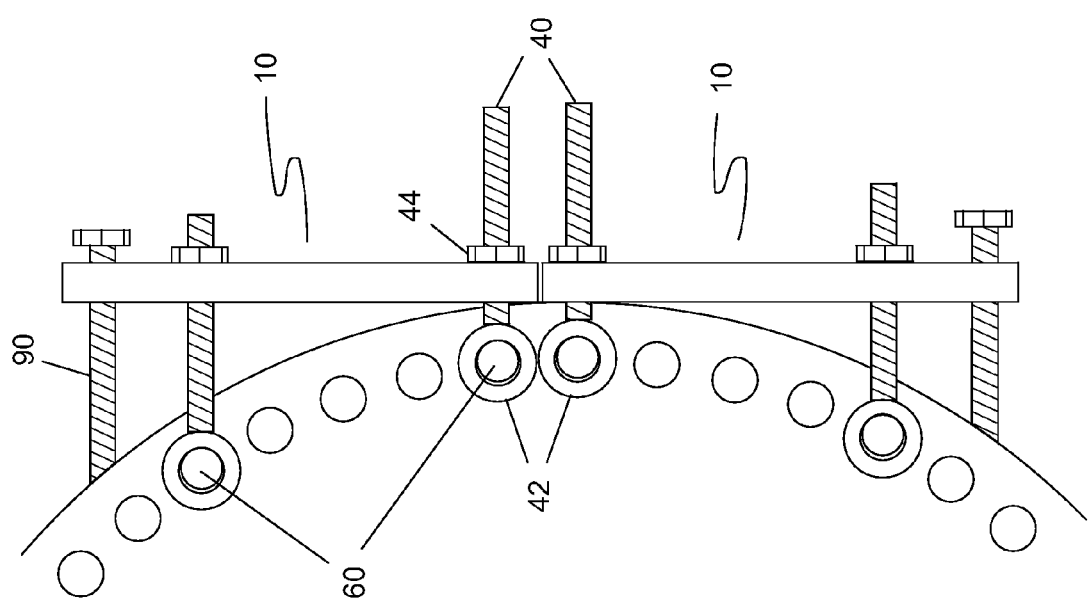

PORTABLE MANWAY COVER HINGE DEVICE

BACKGROUND OF THE INVENTION

1. Field of the Invention

The present invention relates generally to "manway" covers for access to enclosed spaces such as tanks, conduits, storage areas, heat exchanger tubes. Particularly, the present invention relates to mechanisms to assist in the removal of "manway" covers. More particularly, the present invention relates to mechanisms for handling the removal and installation of "manway" covers that are too heavy to be handled by an unaided individual.

2. Description of the Prior Art

Manway covers are typically large, heavy, metal plates that are bolted to an opening. For purposes of the present invention, the definition of "manway covers" expressly means any heavy covers or closures used on pressure vessels, vacuum vessels, atmospheric vessels, heat exchangers, heat exchanger channel covers, heat exchanger channels, heat exchanger bonnets, or any type of blanking plate and is not construed to be limited to only covers used on openings that are dimensionally-sized to allow passage of a man. The most common are circularly-shaped and mate to a flange by way of a plurality of bolts evenly spaced around the periphery of the opening. However, it should be understood that the heavy covers may be any shape. The defined manway covers typically provide access to enclosed spaces such as tanks, conduits, storage areas, transfer tubes, pressure vessels, vacuum vessels, atmospheric vessels, heat exchangers, heat exchanger channel covers, heat exchanger channels, heat exchanger bonnets, and the like.

Routine servicing and inspection requirements as well as other operating conditions necessitate periodic removal of these manway covers. In view of the typical location and weight of the manway covers, it is not a simple task to remove the cover or to re-install the same. Removal is currently accomplished with the use of hand operated davit swing arms, chain falls, ratchet hoists, and brute force. Except for davit swing arms, it is necessary during the removal process to lower the covers a distance to a level surface.

Various devices have been devised to facilitate manway cover removal and re-installation. U.S. Patent Application Publication 2005/0242051 (2005, Porebski et al.) discloses a removable cover support system having a base member and a securing mechanism slidably insertable through at least one of a cover flange hole of a cover assembly, a retaining sleeve connected to the securing base assembly, a swingarm assembly rotatably supported by the retaining sleeve, and a lifting mechanism connected to the swingarm assembly.

U.S. Pat. No. 4,519,519 (1985, Meuschke et al.) discloses a davit assembly that is connected with a transfer tube and a hatch cover to move the cover away. The davit assembly, which is a swingarm, is permanently attached to the outside of the transfer tube.

U.S. Pat. No. 4,297,072 (1981, Shah et al.) discloses a manway handling apparatus having a support arm pivotally mountable on equipment having elliptical manway access openings. The support arm when mounted is swingable toward and away from an access opening and carries a bearing block supporting bracket which is longitudinally adjustably positionable on the arm. The bearing block is vertically adjustably positionable in the bracket and slidably supports a shaft which is attachable to an elliptical cover. The shaft carries structure means which when actuated by turning of a crank handle is effective for tilting the cover and to facilitate its installation and removal.

U.S. Pat. No. 4,865,513 (1989, Norris) discloses a portable manway cover handling apparatus. A boom is mounted within a sleeve for longitudinal translation and the sleeve is hinged to a base plate that is securable by a C-clamp to a superstructure beam in front of a manway cover. A hydraulic actuator bears against the sleeve to adjust its elevation. A powered cable winch is joined to one end of the boom and its cable passes through the boom, which is hollow to the opposite end, and about a pulley to a fastener for attachment to an eye secured in the upper edge of the manway cover. A presser foot is hydraulically actuated to bear against the manway cover with the cable attached to the cover so that the bolts holding the cover in place can be removed. Guide pins are provided for installation in the mounting flange to pilot the cover into registration with the bolt holes when the cover is to be mounted rather than demounted.

The prior art devices suffer from various disadvantages. The swingarm devices are bulky and comprise multiple parts for removably attaching the assembly to the manway or the swingarms are permanently attached to the manway. Other devices are also large, bulky and complicated structures using a boom that requires the base plate of the device to be secured by a C-clamp to a superstructure beam.

Therefore, what is needed is a manway cover handling device that is compact and portable. What is also needed is a manway cover handling device that is easy to attach and remove from a manway only when the manway cover needs to be removed. What is further needed is a manway cover handling device that is relatively lightweight compared to prior art devices. What is still further needed is a manway cover handling device that is simple to assemble.

SUMMARY OF THE INVENTION

It is an object of the present invention to provide a portable manway cover hinge device that can be quickly and easily installed to remove and/or install, support, and/or store a manway cover. It is another object of the present invention to provide a portable manway cover hinge device that can be used in confined or congested areas to remove and/or install, support, and/or store a manway cover. It is a further object of the present invention to provide a portable manway cover hinge device that does not require its use from the floor to remove and/or install, support, and/or store a manway cover. It is still another object of the present invention to provide a portable manway cover hinge device that is portable and that can be used as required in different locations to remove and/or install, support, and/or store a manway cover. It is yet another object of the present invention to provide a portable manway cover hinge device that one man can handle and install for removing and/or installing, supporting, and/or storing a manway cover.

It is another object of the present invention to provide a portable manway cover hinge device that does not require welding for installation. Given that welding to some equipment structures (pressure vessels and the like) may adversely affect the integrity/reliability of the equipment structure, or re-certification of the equipment structure.

It is a further object of the present invention to provide a portable manway cover hinge device that may be used on non-ferrous and/or non-metallic structures having a manway cover. Since many equipment structures are constructed of non-metallic materials such as Fiberglas™ or other composite materials, a method of manipulating a manway cover in this environment is highly desirable.

It is still a further object of the present invention to provide a portable manway cover hinge device that is relatively universal and can be used on manway covers of various sizes.

The present invention achieves these and other objectives by providing a portable manway hinge device. The manway hinge device includes a pair of elongated hinge members where each hinge member has a pair of longitudinally-aligned, elongated apertures, a support member slidably connected to each of the elongated apertures where the support member has a pin receiving end, and a linkage member privotally connected to each of the pair of elongated hinge members. An optional pin may be provided or the manway cover bolts may be used as the pins for securing the support members to the manway cover and flange.

For manways having split covers, the present invention also includes an optional component for using two portable manway hinge devices. In one embodiment, the optional component is a hinge connector that connects one hinge member of one hinge device to a serially-aligned hinge component of an adjacent hinge device. The hinge connector may be attached between the two serially aligned hinge components using alignment pins, threaded rods, securing brackets, and the like. In another embodiment, the optional component is a leveling member connected at or adjacent one end of the hinge device. The leveling member on the flange hinge member may be aligned for contact with the peripheral edge of the flange or with the manway extension connected to the flange. The leveling member on the cover hinge member is aligned for contact with the peripheral edged of the cover.

One of the main advantages of the present invention is that the present invention does not require welding of the hinge device to the equipment with the removable cover.

BRIEF DESCRIPTION OF THE DRAWINGS

FIG. 3 is a front view of one embodiment of the elongated hinge member of the present invention showing the longitudinally-aligned, elongated apertures located within a central portion of the hinge member.

FIG. 4 is a side view of the elongated hinge member shown in FIG. 3.

FIG. 5 is an end view of the elongated hinge member shown in FIG. 3.

FIG. 9 is a top view of one embodiment of the linkage member of the present invention showing an adjustment slot.

FIG. 10 is an end view of the linkage member shown in FIG. 9.

FIG. 11 is a side view of one embodiment of a support member of the present invention showing a pin receiving end.

FIG. 14 is a side view of another embodiment of the present invention for use with a split manway cover in a closed position showing the use of a leveling member at or adjacent the end of the elongated hinge member.

DETAILED DESCRIPTION OF THE PREFERRED EMBODIMENT

Figure 1:
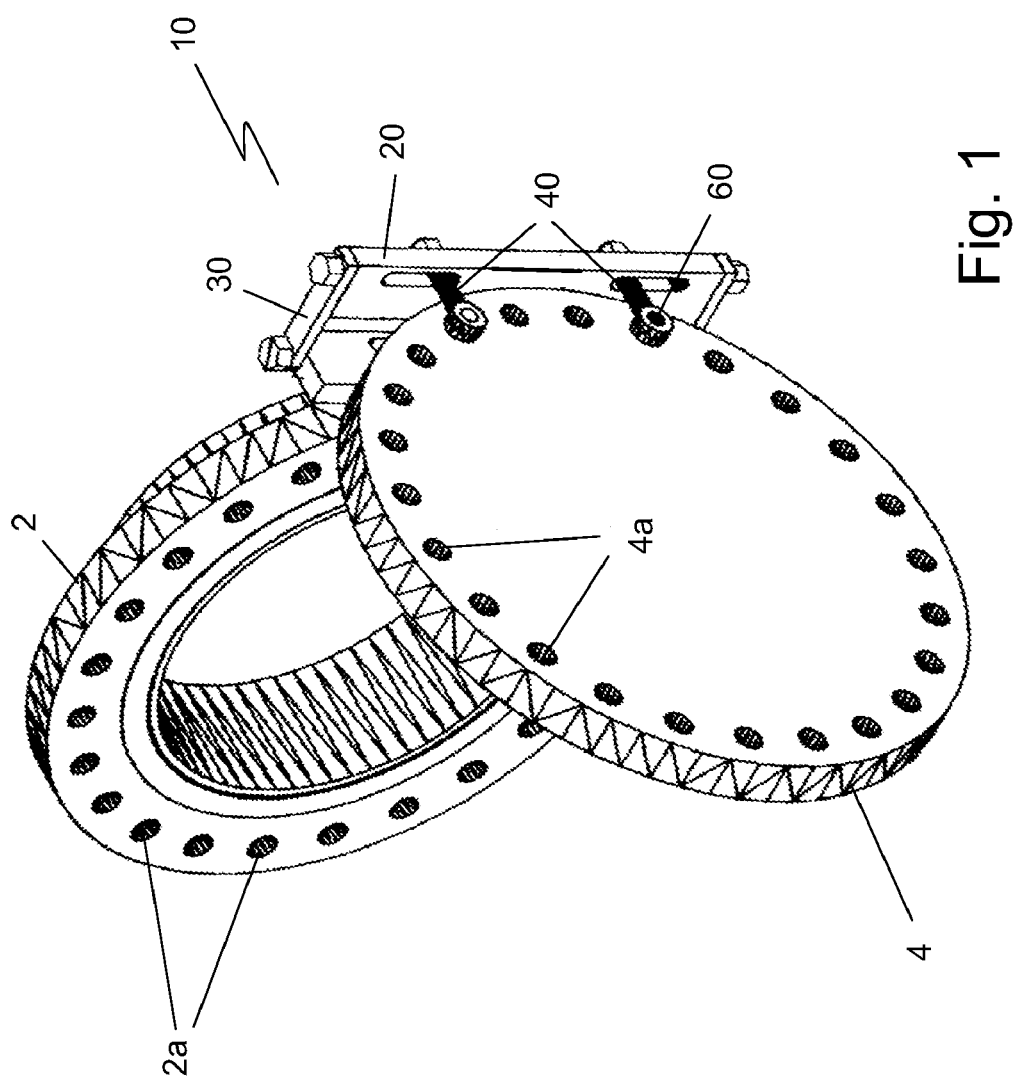
FIG. 1 is a perspective view of one embodiment of the present invention attached to a manway flange and manway cover showing the manway cover in an open and supported position.

The preferred embodiment(s) of the present invention is illustrated in FIGS. 1-14. FIG. 1 illustrates the use of a portable manway cover hinge device 10 on a manway. Hinge device 10 includes a pair of elongated hinge members 20, a linkage member 30 and a plurality of support members 40. One of the elongated hinge members 20 is connected to a manway cover flange 2 and the other of the elongated hinge members 20 is connected to the peripheral edge of manway cover 4. Linkage member 30 is pivotally connected to the pair of elongated hinge members 20 and configured to swing manway cover 4 away from manway opening 6 providing access to the inside of the manway structure. A plurality of pins 60 secure a plurality of support members 40 to a plurality of bolt holes 2a and 4a in manway flange 2 and manway cover 4, respectively.

Figure 2:
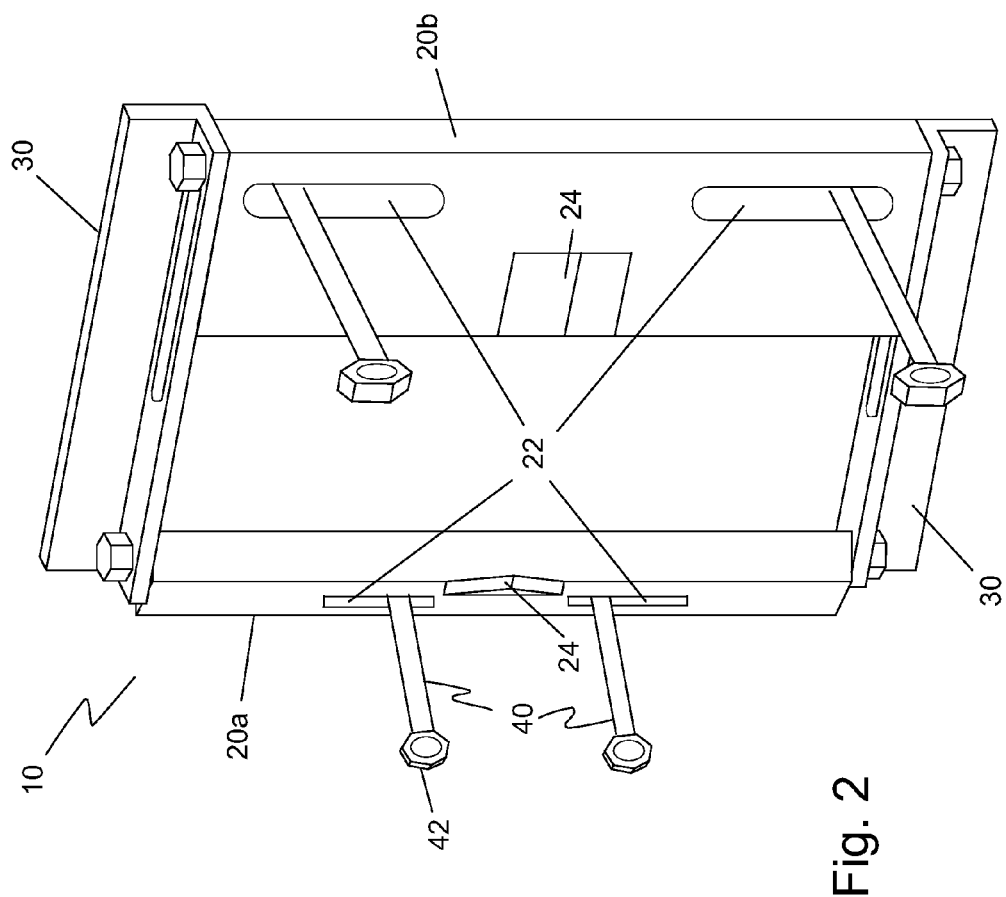
FIG. 2 is a perspective view of the present invention showing the major components of the hinge device.

FIG. 2 illustrates the portable manway cover hinge device 10. Hinge device 10 includes a pair of elongated hinge members 20 comprising a flange hinge member 20a and a cover hinge member 20b. A linkage member 30 connects flange hinge member 20a to cover hinge member 20b at each end. Linkage member 30 maintains the proper spacing between the elongated hinge members 20 while being configured to pivot the pair of elongated hinge members 20 relative to each other. The elongated hinge members 20 each have a pair of longitudinally-aligned apertures 22 therethrough. Each longitudinally-aligned aperture 22 has a support member 40 received therethrough for connecting the hinge device 10 to the manway flange 2 and the manway cover 4. Support member 40 has a pin receiving end 42 that is used for connecting to manway flange 2 and manway cover 4. As can be seen from FIG. 2, flange hinge member 20a and cover hinge member 20b have an optional recessed portion 24 in the surface of the members 20a, 20b positioned approximately at the middle of hinge members 20 inward from a longitudinal edge that is furthest from the longitudinally-aligned apertures 22.

FIG. 3 is a front view of flange hinge member 20a. Flange hinge member 20a has longitudinally-aligned apertures 22 preferably positioned within a central portion 25 of flange hinge member 20a where one of the elongated sides 22' of apertures 22 are located along a longitudinal center line 100 of flange hinge member 20a. Apertures 22 are spaced from each other to provide adjustability for use on manway covers of different sizes, which typically would have different spacing between radial cover bolt locations depending on the size of the manway cover. The elongated apertures 22 are configured to adjust for the difference in distance between the bolts of the cover 4. Optional recessed portion 24 is located in central portion 25 on the opposite side of longitudinal center line 100 from apertures 22. Preferably, recessed portion 24 is contiguous to member edge 26. Each hinge member end 21 has an end recess 21a for receiving a fastener that connects linkage member 30 (not shown) to flange hinge member 20a.

FIG. 4 is a side view showing optional recessed portion 24. As illustrated, optional recessed portion 24 is V-shaped but could also be any shape that provides a surface for positioning against the peripheral edge of the manway flange 2 or cover 4. Apertures 22 pass completely through flange hinge member 20a and are elongated to provide spacing for longitudinal adjustment of a support member 40 (not shown). FIG. 5 is an end view of flange hinge member 20a showing the end recess 21a. End recess 21a is preferably a threaded recess but may, in the alternative, be configured for a removable compression fitting.

Figure 6:
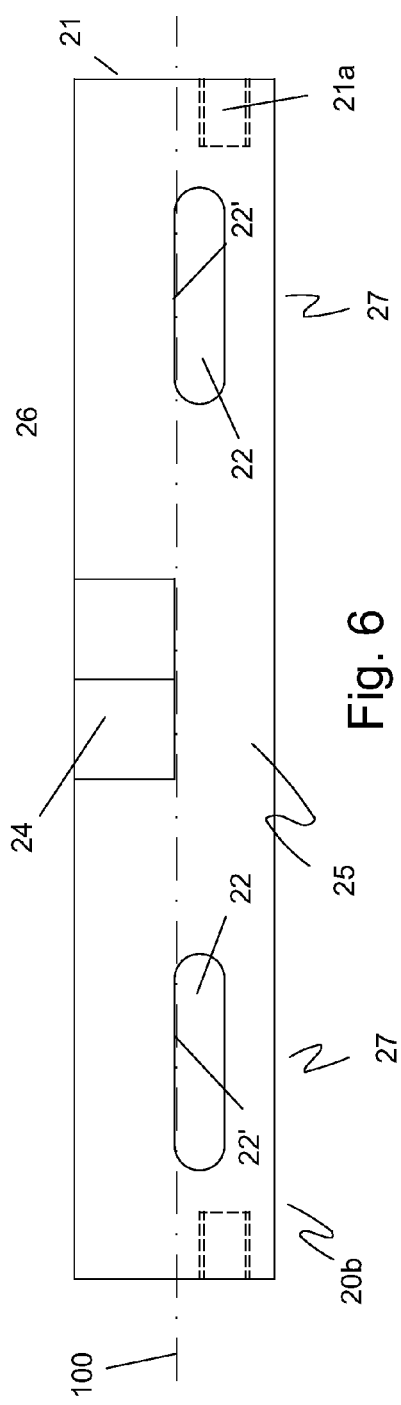
FIG. 6 is a front view of another embodiment of the elongated hinge member of the present invention showing the longitudinally-aligned, elongated apertures locate within the end portion of the hinge member.

FIG. 6 is a front view of cover hinge member 20b. Cover hinge member 20b has longitudinally-aligned apertures 22 preferably positioned within an end portion 27 of cover hinge member 20b where one of the elongated sides 22' of apertures 22 are located along a longitudinal center line 100 of flange hinge member 20b. Apertures 22 are spaced from each other to not only provide adjustability for use on manway covers of different sizes, but also to provide better support for manway cover 4 and prevent inadvertently aligning a support member 40 of cover hinge member 20b with a support member 40 of flange hinge member 20a. Like elongated apertures 22 in flange hinge member 20a, the elongated apertures 22 of cover hinge member 20b are configured to adjust for the difference in distance between the bolts of the cover 4. Cover hinge member 20b may also have optional recessed portion 24. Optional recessed portion 24 is located in central portion 25 on the opposite side of longitudinal center line 100 from apertures 22. Preferably, recessed portion 24 is contiguous to member edge 26. Each hinge member end 21 has an end recess 21a for receiving a fastener that connects linkage member 30 (not shown) to cover hinge member 20b and may be configured to receive a fastener as are known to those skilled in the art to support attachment with linkage member 30.

Figure 7:
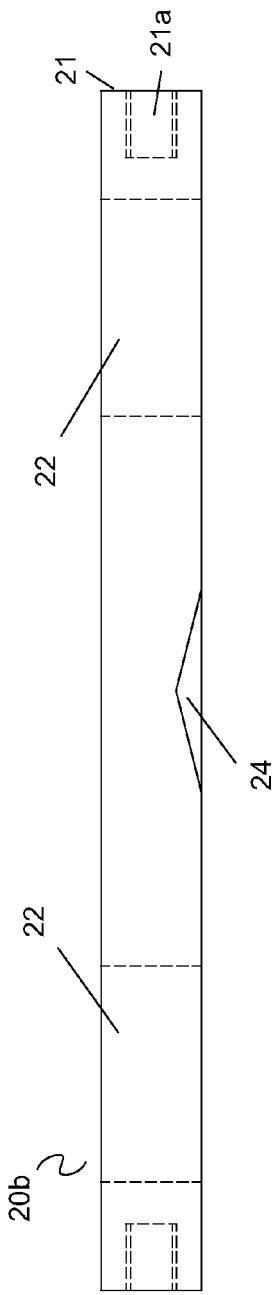
FIG. 7 is a side view of the elongated hinge member shown in FIG. 6.
Figure 8:
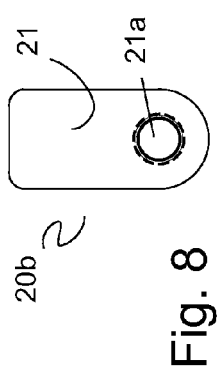
FIG. 8 is an end view of the elongated hinge member shown in FIG. 6.

FIG. 7 is a side view showing optional recessed portion 24. As illustrated, optional recessed portion 24 is V-shaped but could also be any shape that provides a surface for positioning against the peripheral edge of the manway cover 4. Apertures 22 pass completely through cover hinge member 20b and are elongated to provide spacing for longitudinal adjustment of a support member 40 (not shown). FIG. 8 is an end view of cover hinge member 20b showing the end recess 21a. As illustrated in the Figures, flange hinge member 20a and cover hinge member 20b are similar except for the location of the longitudinally-aligned apertures 22. This simplifies manufacturing of the components and, thus, reduces cost.

Turning now to FIG. 9, there is illustrated a top plan view of linkage member 30. Linkage member 30 has a first linkage aperture 34 near one end and a second linkage aperture 36 near the opposite end. Second linkage aperture 36 is preferably an elongated slot, which provides a mechanism for adjusting the distance between flange hinge member 20a (not shown) and cover hinge member 20b (not shown) depending on the size/thickness of the manway flange 2 and the manway cover 4. First linkage aperture 34 and second linkage aperture 36 are configured to receive fasteners that attach linkage member 30 to the ends 21 of flange hinge member 20a and cover hinge member 20b.

FIG. 10 is an end view of linkage member 30. FIG. 10 illustrates linkage member 30 as being an L-shaped linkage having a first leg 31 and a second leg 32. It should be noted that linkage 30 may be flat instead of L-shaped or it may be tubular. The purpose of linkage member 30 is to connect flange hinge member 20a to cover hinge member 20b where hinge members 20a and 20b are pivotally connected to swing cover 4 away from fange 2.

FIG. 11 is a side view of a support member 40. Preferably, support member 40 has a threaded rod 41 with a pin receiving end 42. Pin receiving end 42 has a pin receiving aperture 43. Optionally, pin receiving aperture 43 may be threaded to accept a bolt similar to the bolts that secure the manway cover 4 to manway flange 2 (or may be the cover bolts themselves). The bolt acts as a pin 60 for connecting support member 40 to the manway flange 2 and manway cover 4. A support member nut 44 is configured for threadable attachment to threaded rod 41 and used to retain support member 40 within the elongated apertures 22 of hinge members 20a, 20b.

Figure 12:
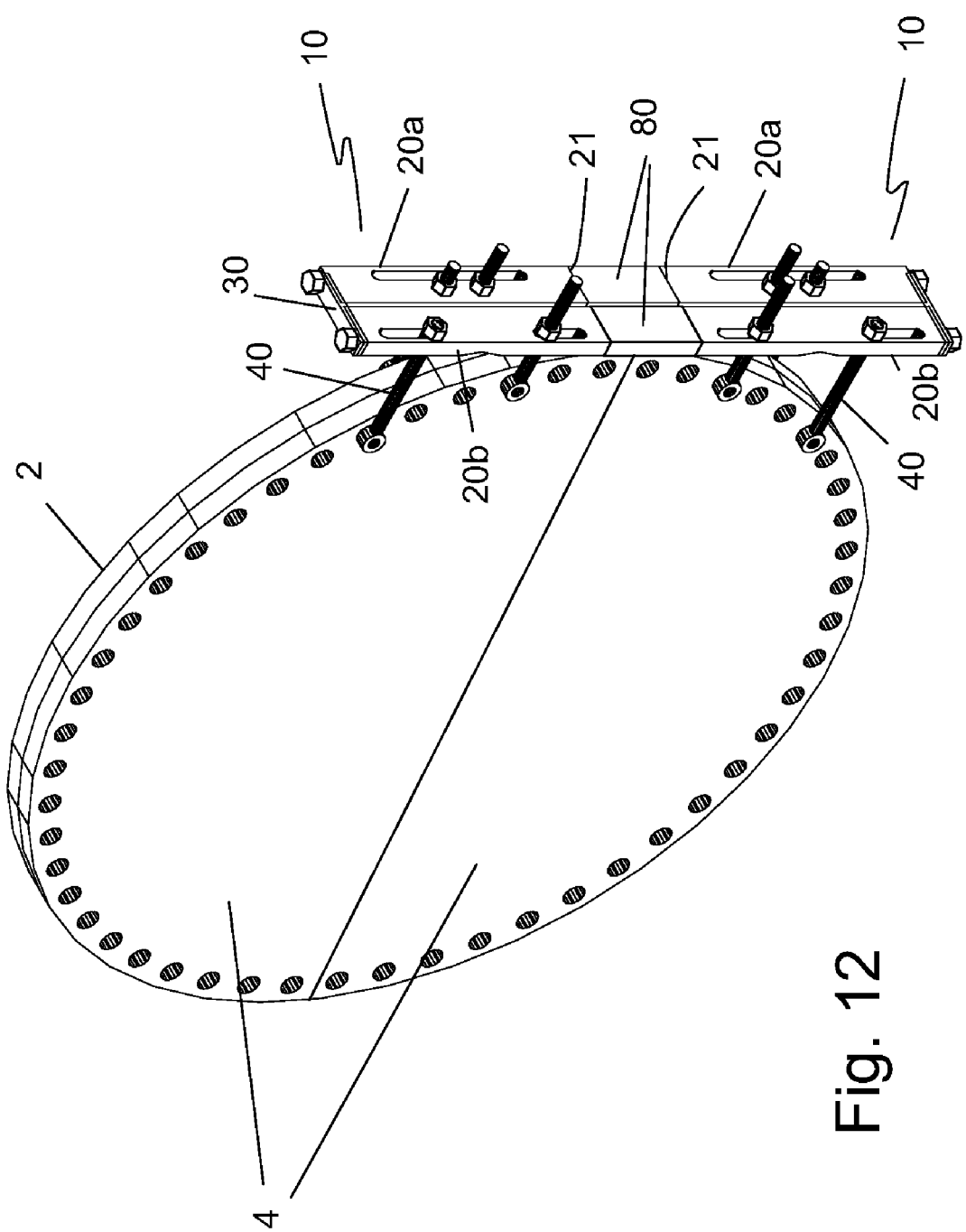
FIG. 12 is a perspective view of another embodiment of the present invention showing a connecting member between a pair of serially aligned hinge devices and mounted on a split manway cover and a manway flange with the cover in the closed position.
Figure 13:
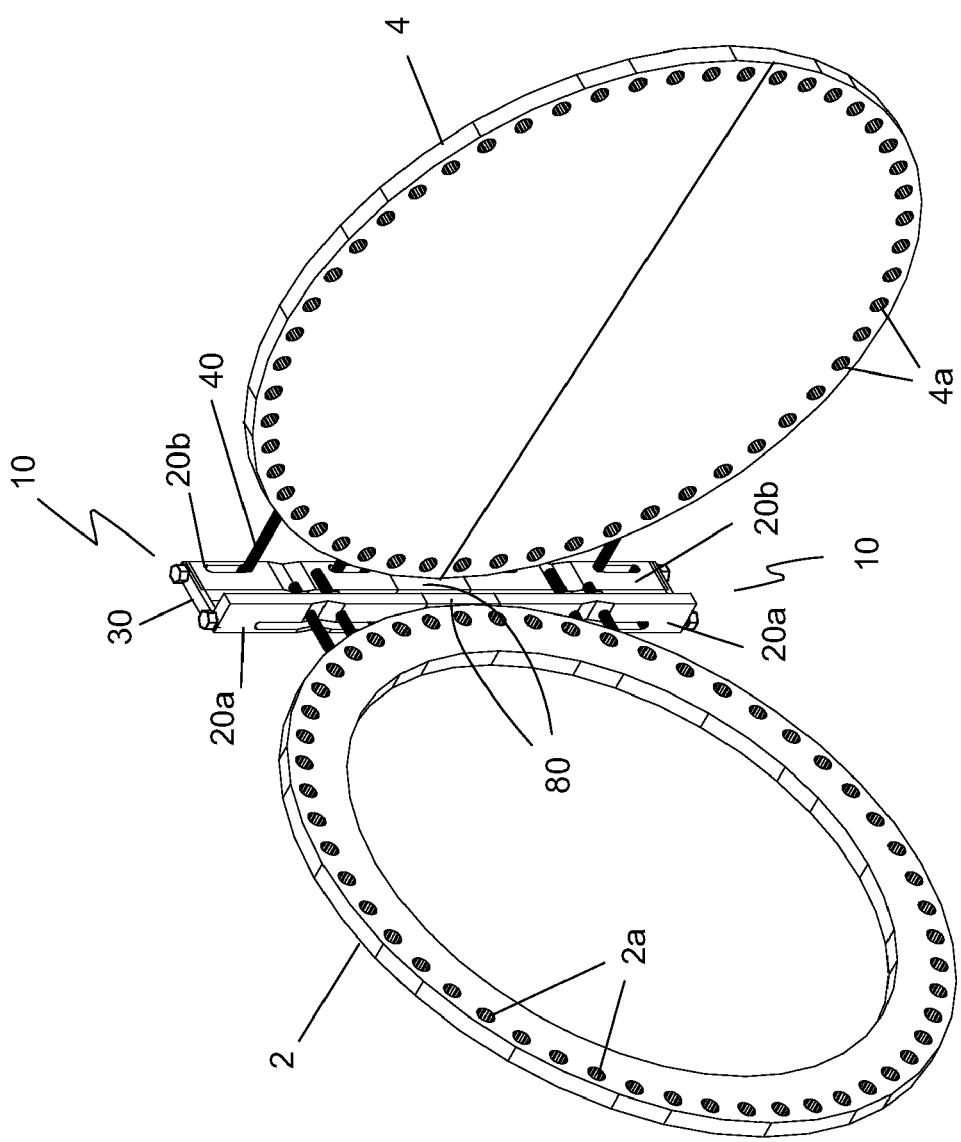
FIG. 13 is a perspective view of the embodiment of the present invention shown in FIG. 12 showing the split manway cover in an open position.

In some situations, a manway cover is a split cover. The present invention may also be used on split manway covers by providing a slight modification to the manway cover hinge device 10. FIG. 12 illustrates one embodiment of such a modification. FIG. 12 shows a manway cover 4 in position against a manway cover flange 2. Two hinge devices 10 are used in this situation. Hinge devices 10 are serially aligned end to end with each other. A hinge connector 80 is removably attached to each end 21 of flange hinge member 20a and cover hinge member 20b between the two serially aligned hinge devices 10 and provides a surface against which the peripheral edge of manway flange 2 and manway cover 4 make contact. Hinge connector 80 may be connected to hinge devices 10 with alignment pins, threaded rods, tubular brackets, and the like (not shown). FIG. 13 is a perspective view of the embodiment in FIG. 12 showing the manway cover 4 pivotally moved away from manway cover flange 2.

FIG. 14 is a side view of another embodiment of the present invention for use with split manway covers. In this embodiment, hinge devices 10 are serially aligned and adjacent to each other but not connected together. Instead, each hinge device has a leveling member 90 attached to an end portion 27 of flange hinge member 20a and cover hinge member 20b. In the embodiment illustrated in FIG. 14, leveling member 90 is a set screw. Leveling member 90 of flange hinge member 20a may contact the peripheral edge of manway flange 2 or to the extension tube (not shown) to which manway flange 2 is attached. In this illustration, there is also shown the use of a pin 60 through the bolt holes of manway cover 4 and manway flange 2. Leveling member 90 of cover hinge member 20b preferably contacts the peripheral edge of manway cover 4.

In all of the embodiments of the present invention, pin 60 can be a bolt or pin. For example, pin 60 may be the existing studs or bolts from the manway cover 4 and manway cover flange 2, a close fit pin, a special bolt/pin with an interference fit at the flange hole and the cover hole, a bolt with threads configured to attache to a threaded pin receiving end 42 of support member 40, a tapered pin, a bolt/pin that is eccentric or concentric to the flange hole and the cover hole and could be a loose or tight fit to the hole.

One of the methods of using the hinge device 10 of the present invention will now be explained. A plurality of bolts are removed from one portion of a manway cover 4. A support member 40 is inserted into each of the longitudinally-aligned apertures 22 of flange hinge member 20a and cover hinge member 20b such that pin receiving end 42 may be adjustably aligned with the bolt holes of the flange 2 and cover 4. A support member nut 44 is then loosely threaded on the opposite end of support member 40 of each support member 40 to prevent the separation of support member 40 from flange hinge member 20a and cover hinge member 20b. Linkage member 30 may be loosely connected to each end 21 of hinge members 20a and 20b or may be connected after hinge members 20a and 20b are connected to the flange 2 and cover 4, respectively. Because flange hinge member 20a is connected to the flange, flange hinge member 20a is considered the fixed hinge member. Linkage member 30 is pivotally connected to flange hinge member 20*a* and preferably fixedly connected to cover hinge member 20*b*.

Pin receiving ends 42 are aligned with the holes previously occupied by the flange/cover bolts. A pin 60 is inserted into each pin receiving end 42 and the bolt hole of flange 2 and cover 4 with which it is aligned. Each bolt hole will have two pins 60, one for the flange hole and one for the cover hole. The bolts that were removed from the cover may also be used as pins 60. Once inserted, support member nuts 44 are tightened drawing pin receiving ends 42 toward their respective hinge members 20*a*, 20*b*. This action causes the pins 60 to press against the bolt holes (particularly if unthreaded pins are used) and secures the hinge device 10 to the cover and flange. Once support member nuts 44 on support members 40 are sufficiently tightened and linkage member 30 securely attached (if not previously attached), the remaining manway cover bolts are removed and the cover is pivoted away from the flange. To reinstall the manway cover, the procedure is reversed. The cover is pivoted into position and a majority of the cover bolts are attached and secured before loosing the nuts 44 of support members 40 and disassembling hinge device 10. One of the many advantages of the present invention is the use of pins 60 to secure the hinge device 10 to the flange 2 and cover 4. This configuration facilitates alignment of cover 4 to flange 2 when re-installing cover 4 to flange 2.

It should be noted that the support members 40 uses a pulling-type pressure to cause the pins 60 to secure the cover and flange, i.e. the pins 60 are pulled toward hinge device 10. However, it should be understood that a pushing-type pressure can also be used by simply using a configuration such as a spacer rod. The spacer rod may be a rod, screw, bolt or any structure that acts as a spacer between the hinge members 22 and the peripheral edge of cover 4 and flange 2. An example of a preferred spacer rod is a Jack screw or expanding screw. When a Jack screw or expanding screw is used, the spacer rod also serves as a set screw. Examples of such a pushing type pressure are illustrated in US Pat. Appl. Pub. No. 2005/0242051 in FIGS. 25-32, which are incorporated herein by reference.

Locknuts may also be optionally incorporated into the present invention to prevent inadvertent loosening of the support members 40 during use. Various configurations are contemplated and are within the scope of the present invention, but each such configuration requires a support member 40 used in conjunction with a pin 60 for each cover hole and flange hole used to attach the present invention to the manway cover 4 and the manway flange 2.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A portable manway hinge device for handling the removal and installation of a manway cover from a manway flange having a plurality of bolts inserted through a plurality of transverse and aligned bolt openings of the manway cover and the manway flange, the device comprising:
   a pair of elongated hinge members wherein each hinge member has a pair of longitudinally-aligned, elongated apertures;
   a support member slidably disposed and extending through each of the elongated apertures wherein the support member has a pin receiving end, the in receiving end having an opening configured to be aligned with one of the plurality of bolt openings of the manway cover or the manway flange and to receive a in therethrough and into the one of the plurality of bolt openings; and
   a linkage member pivotally connected to each of the pair of elongated hinge members.

2. The hinge device of claim 1 wherein the device further includes a pin connected to the pin receiving end of the support member.

3. The hinge device of claim 2 wherein the pin receiving end of the support member is threaded.

4. The hinge device of claim 2 wherein the pin is sized to fit within the bolt holes of the manway flange and manway cover.

5. The hinge device of claim 1 wherein the pair of elongated hinge member have a central portion and end portions.

6. The hinge device of claim 5 wherein the pair of elongated hinge members include a flange hinge member and a cover hinge member.

7. The hinge device of claim 6 wherein the flange hinge member has the pair of longitudinally-aligned, elongated apertures located within the central portion.

8. The hinge device of claim 5 wherein the elongated hinge members have a recessed portion in a surface of the central portion.

9. The hinge device of claim 5 further comprising a leveling member connected to the end portion.

10. The hinge device of claim 9 wherein the leveling member is a set screw.

11. The hinge device of claim 6 wherein the cover hinge member has the pair of longitudinally-aligned, elongated apertures located within the end portions.

12. The hinge device of claim 1 wherein the linkage member has an adjusting slot.

13. The hinge device of claim 1 further comprising a hinge connector configured for attachment to an end of two serially aligned elongated hinge members.

14. A method of handling the removal and installation of a manway cover to a manway flange, the method comprising:
   removing a plurality of manway cover bolts from a portion of the manway cover;
   assembling a portable manway cover hinge device having a flange hinge member, a cover hinge member wherein each hinge member has a pair of longitudinally-aligned, elongated apertures and a plurality of support members slidably disposed and extending through each of the elongated apertures of the flange hinge member and the cover hinge member;
   aligning a pin receiving end of each of the plurality of support members with the bolt holes of the manway cover or the manway flange removed from the portion of the manway cover;
   inserting a pin into each pin receiving end and corresponding manway cover hole and a pin into each pin receiving end and corresponding manway flange hole;
   securing each pin within the corresponding cover hole and flange hole; and
   removing the remaining manway cover bolts from the manway cover.

15. The method of claim 14 wherein the pin securing step includes drawing each pin towards the manway hinge cover device until the manway cover hinge device is securely connected to the manway cover and the manway flange.

16. The method of claim 14 wherein the removing step includes swinging the manway cover about the manway cover hinge device.

* * * * *